(12) United States Patent
de Bruijn

(10) Patent No.: US 11,136,095 B2
(45) Date of Patent: Oct. 5, 2021

(54) FENDER, MARITIME STRUCTURE, METHOD FOR MANUFACTURING

(71) Applicant: D.B.M. Fabriek en Handelsonderneming B.V., Maassluis (NL)

(72) Inventor: Jacob de Bruijn, Maassluis (NL)

(73) Assignee: FENDER INNOVATIONS HOLDING B.V., Wieringerwerf (NL)

( * ) Notice: Subject to any disclaimer, the term of this patent is extended or adjusted under 35 U.S.C. 154(b) by 0 days.

(21) Appl. No.: 14/399,689

(22) PCT Filed: May 13, 2013

(86) PCT No.: PCT/NL2013/050355
§ 371 (c)(1),
(2) Date: Nov. 7, 2014

(87) PCT Pub. No.: WO2013/169113
PCT Pub. Date: Nov. 14, 2013

(65) Prior Publication Data
US 2015/0114274 A1 Apr. 30, 2015

(30) Foreign Application Priority Data
May 11, 2012 (NL) ........................ 2008800

(51) Int. Cl.
*E02B 17/00* (2006.01)
*E02B 3/28* (2006.01)
*B63B 59/02* (2006.01)
*E02B 3/26* (2006.01)

(52) U.S. Cl.
CPC ............... *B63B 59/02* (2013.01); *E02B 3/26* (2013.01); *Y02A 30/30* (2018.01)

(58) Field of Classification Search
CPC . E02B 3/26; E02B 17/003; E02B 3/28; B63B 59/02
USPC ................ 405/211, 212, 215; 114/219, 220; 293/107, 129, 131, 132; 14/76
See application file for complete search history.

(56) References Cited

U.S. PATENT DOCUMENTS

| | | | | |
|---|---|---|---|---|
| 747,660 A | * | 12/1903 | Swearingen | E01D 19/02 14/76 |
| 799,645 A | * | 9/1905 | Grimm | B63B 59/02 114/220 |
| 1,877,793 A | * | 9/1932 | Beynon | E02B 3/26 114/219 |
| 2,606,755 A | * | 8/1952 | Samuels | E04H 3/14 267/140 |
| 2,728,702 A | * | 12/1955 | Simon | B29C 44/18 244/126 |

(Continued)

FOREIGN PATENT DOCUMENTS

EP 1695902 A2 8/2006
GB 911869 11/1962

*Primary Examiner* — Edwin J Toledo-Duran
(74) *Attorney, Agent, or Firm* — Hoffmann & Baron, LLP

(57) ABSTRACT

Fender for protecting an object from damage comprising a core of at least a closed cell foam part, an intermediate layer fully enclosing the core comprising at least a fiber reinforced cloth, a coating that at least partly covers the intermediate layer. The invention also relates to a fixed or floating maritime structure provided with such a fender and to a method for manufacturing such a fender.

19 Claims, 7 Drawing Sheets

(56) References Cited

U.S. PATENT DOCUMENTS

| | | | | |
|---|---|---|---|---|
| 2,870,733 A * | 1/1959 | Winther | B63B 21/08 | 114/218 |
| 2,892,315 A * | 6/1959 | Blancato | E02B 3/26 | 405/212 |
| 2,903,990 A * | 9/1959 | Brown | E02B 3/26 | 114/219 |
| 3,109,405 A * | 11/1963 | Nusinoff | B63B 59/02 | 114/219 |
| 3,121,888 A * | 2/1964 | Morgan | B63B 59/02 | 114/360 |
| 3,179,397 A * | 4/1965 | Cleereman | E02B 3/26 | 267/140 |
| 3,197,189 A * | 7/1965 | Pemper | B65G 69/001 | 267/140 |
| 3,301,927 A * | 1/1967 | Exley | B64C 9/02 | 264/45.4 |
| 3,311,081 A * | 3/1967 | Parker | E02B 3/26 | 114/220 |
| 3,326,171 A * | 6/1967 | Zade | B63H 25/00 | 114/220 |
| 3,353,812 A * | 11/1967 | Miller | E02B 3/26 | 267/140 |
| 3,402,558 A * | 9/1968 | Hellinger | B63B 59/02 | 405/213 |
| 3,455,269 A * | 7/1969 | Dean | E02B 3/26 | 114/219 |
| 3,470,048 A * | 9/1969 | Jones | B21D 39/03 | 156/94 |
| 3,557,398 A * | 1/1971 | Pierce | B63B 32/20 | 441/71 |
| 3,574,379 A * | 4/1971 | Jordan | B60R 19/20 | 293/109 |
| 3,728,749 A * | 4/1973 | Eby | B63B 5/24 | 441/1 |
| 3,863,591 A * | 2/1975 | Wild | 114/230.26 | |
| 3,872,525 A * | 3/1975 | Lea | A47C 27/084 | 5/671 |
| 3,873,076 A * | 3/1975 | Evans | B63B 59/02 | 267/140 |
| 3,873,654 A * | 3/1975 | Smith | B29C 70/865 | 264/258 |
| 3,937,170 A * | 2/1976 | Drewett | E02B 3/26 | 114/219 |
| 3,991,582 A * | 11/1976 | Waldrop | E02B 17/003 | 405/213 |
| 4,060,865 A * | 12/1977 | Woolworth | B63B 3/09 | 114/356 |
| 4,098,211 A * | 7/1978 | Files | E02B 17/003 | 405/213 |
| 4,109,474 A * | 8/1978 | Files | E02B 3/26 | 405/213 |
| 4,129,911 A * | 12/1978 | McDonald | B63B 35/7906 | 441/74 |
| 4,250,136 A * | 2/1981 | Rex | B29C 70/08 | 264/257 |
| 4,252,073 A * | 2/1981 | Hartung | B63B 59/02 | 114/219 |
| 4,273,473 A * | 6/1981 | Thomerson | F16F 1/38 | 405/212 |
| 4,281,610 A * | 8/1981 | Young | E02B 3/26 | 114/219 |
| 4,287,624 A * | 9/1981 | Lowther | B63B 43/14 | 114/123 |
| 4,293,241 A * | 10/1981 | Helveston | E02B 3/26 | 405/213 |
| 4,311,412 A * | 1/1982 | Guilbeau | E02B 3/26 | 405/212 |
| 4,335,182 A * | 6/1982 | Brand | B29C 44/3496 | 264/162 |
| 4,338,046 A * | 7/1982 | Thomerson | E02B 3/26 | 405/212 |
| 4,378,749 A * | 4/1983 | Leblanc | E02B 3/26 | 114/220 |
| 4,463,043 A * | 7/1984 | Reeves | B32B 27/08 | 428/68 |
| 4,494,474 A * | 1/1985 | Saito | E06C 9/02 | 114/219 |
| 4,541,885 A * | 9/1985 | Caudill, Jr. | B29C 66/1122 | 156/220 |
| 4,574,101 A * | 3/1986 | Tricca | A63C 19/04 | 428/138 |
| 4,698,252 A * | 10/1987 | Koch | B29C 66/727 | 428/159 |
| 4,715,310 A * | 12/1987 | Curtis | E02B 17/003 | 114/220 |
| 4,753,836 A * | 6/1988 | Mizell | B63B 32/50 | 428/71 |
| 4,843,994 A * | 7/1989 | Wilson | B63B 59/02 | 114/219 |
| 4,875,427 A * | 10/1989 | Harris, Jr. | B63B 59/02 | 114/219 |
| 4,893,576 A * | 1/1990 | Day | B63B 59/02 | 114/219 |
| 5,007,363 A * | 4/1991 | James | E02B 3/26 | 114/219 |
| 5,013,272 A * | 5/1991 | Watkins | E02B 3/26 | 441/127 |
| 5,016,554 A * | 5/1991 | Harris, Jr. | E02B 3/26 | 114/219 |
| 5,085,487 A * | 2/1992 | Weingartner | B60N 2/58 | 297/452.1 |
| D335,108 S * | 4/1993 | Armour, II | D12/168 | |
| 5,220,879 A * | 6/1993 | Johnson | E02B 3/26 | 114/219 |
| 5,235,715 A * | 8/1993 | Donzis | B32B 3/26 | 12/142 R |
| 5,247,897 A | 9/1993 | Pepp | | |
| 5,313,907 A * | 5/1994 | Hodges | B63B 39/06 | 114/219 |
| 5,370,444 A * | 12/1994 | Stulik | A47C 1/023 | 297/284.11 |
| 5,441,006 A * | 8/1995 | Wood | B63B 59/02 | 114/220 |
| 5,524,308 A * | 6/1996 | Hwang | A47C 1/143 | 5/490 |
| 5,560,312 A * | 10/1996 | McPherson | B63B 59/02 | 114/219 |
| 5,589,243 A * | 12/1996 | Day | B29C 44/5654 | 428/316.6 |
| 5,625,999 A * | 5/1997 | Buzza | E04C 2/296 | 52/309.11 |
| 5,660,133 A * | 8/1997 | Munich | B63B 59/02 | 114/218 |
| 5,679,432 A * | 10/1997 | Holmquest | B32B 5/18 | 428/71 |
| 5,762,016 A * | 6/1998 | Parsons | E02B 3/26 | 114/219 |
| 5,878,685 A * | 3/1999 | Hemphill | B63B 27/143 | 114/219 |
| 6,106,190 A * | 8/2000 | Nakamura | E02B 3/26 | 403/408.1 |
| 6,196,150 B1 * | 3/2001 | Fondacaro | E02B 3/26 | 114/219 |
| 6,196,156 B1 * | 3/2001 | Denesuk | A01K 1/0152 | 119/28.5 |
| 6,332,421 B1 * | 12/2001 | Leonard | B63B 59/02 | 114/219 |
| 6,364,293 B1 * | 4/2002 | Beckett | B63B 59/02 | 267/140 |
| 6,513,449 B1 * | 2/2003 | Stewart | E02B 3/26 | 114/219 |
| 6,860,221 B1 * | 3/2005 | Henderson | B63B 3/08 | 114/352 |
| 6,988,457 B2 * | 1/2006 | Tsai | B63B 59/02 | 114/219 |
| 7,025,012 B1 * | 4/2006 | Pecharich | B63B 21/04 | 114/218 |

(56) References Cited

U.S. PATENT DOCUMENTS

| | | | |
|---|---|---|---|
| 7,025,644 B2* | 4/2006 | Geier | B63H 19/02 |
| | | | 441/74 |
| 7,090,206 B2* | 8/2006 | Chase | F16F 9/003 |
| | | | 267/139 |
| 7,143,708 B1* | 12/2006 | Cimino | B63B 59/02 |
| | | | 114/219 |
| 7,448,338 B2* | 11/2008 | Stewart | E02B 3/26 |
| | | | 114/219 |
| 7,506,601 B2* | 3/2009 | Adams | E02B 3/26 |
| | | | 114/219 |
| 7,507,468 B2* | 3/2009 | Landvik | A47C 27/15 |
| | | | 428/316.6 |
| 7,584,943 B2* | 9/2009 | DiBiase | B65G 69/001 |
| | | | 114/219 |
| D617,694 S* | 6/2010 | Kunkemoeller | D12/168 |
| 7,895,963 B2* | 3/2011 | Roy | B63B 5/14 |
| | | | 114/357 |
| 7,921,791 B2* | 4/2011 | Brelsford | B63B 21/00 |
| | | | 114/219 |
| 8,156,883 B2* | 4/2012 | Sheedy | B63B 59/02 |
| | | | 114/219 |
| 8,291,847 B2* | 10/2012 | Brelsford | B63B 21/00 |
| | | | 114/219 |
| 8,510,885 B2* | 8/2013 | Dennis | A47C 27/14 |
| | | | 5/699 |
| 9,314,118 B2* | 4/2016 | Blazar | A47G 9/1027 |
| 9,775,451 B1* | 10/2017 | Chon | A47G 9/10 |
| 2002/0152943 A1* | 10/2002 | Thomas | B63B 59/02 |
| | | | 114/219 |
| 2003/0019415 A1 | 1/2003 | Leemon | |
| 2003/0046831 A1* | 3/2003 | Westin | A43B 13/203 |
| | | | 36/29 |
| 2003/0200910 A1 | 10/2003 | Corlett | |
| 2004/0221788 A1* | 11/2004 | Sievewright | E02B 3/26 |
| | | | 114/219 |
| 2005/0260901 A1* | 11/2005 | Brauers | B63B 32/57 |
| | | | 441/74 |
| 2005/0278852 A1* | 12/2005 | Wahrmund | A47G 9/1081 |
| | | | 5/636 |
| 2006/0031996 A1* | 2/2006 | Rawls-Meehan | A47C 21/046 |
| | | | 5/724 |
| 2006/0211971 A1* | 9/2006 | Horn | A61F 13/0203 |
| | | | 602/41 |
| 2006/0226626 A1* | 10/2006 | Dehn | B62J 99/00 |
| | | | 280/220 |
| 2008/0132820 A1* | 6/2008 | Buckman | A61F 13/0246 |
| | | | 602/48 |
| 2008/0233357 A1* | 9/2008 | Winckler | B32B 3/12 |
| | | | 428/178 |
| 2008/0314510 A1* | 12/2008 | Hood | B29C 66/91411 |
| | | | 156/221 |
| 2009/0011667 A1* | 1/2009 | Hayward | B63B 32/00 |
| | | | 441/74 |
| 2012/0011656 A1* | 1/2012 | Daly | A47C 27/081 |
| | | | 5/652.1 |
| 2012/0196079 A1* | 8/2012 | Brauers | B32B 3/26 |
| | | | 428/116 |
| 2013/0036960 A1* | 2/2013 | Berman | B63B 59/02 |
| | | | 114/219 |
| 2019/0059548 A1* | 2/2019 | Chaillet-Piquand | A45D 33/34 |

* cited by examiner

FENDER, MARITIME STRUCTURE, METHOD FOR MANUFACTURING

This application is the U.S. National Phase of, and Applicant claims priority from, International Patent Application Number PCT/NL2013/050355 filed 13 May 2013, which claims priority from NL2008800 filed 11 May 2012, each of which is incorporated herein by reference.

The invention relates to fenders for protecting an object against impact, in particular to fenders for naval activity.

Fenders are known in particular in marine applications to prevent objects like vessels, such as ships, barges and the like, from getting damaged due to impact or contact whilst mooring to wharfs, docks or shores or ship to ship interaction. Fenders can have different forms or shapes, like fixed to a fixed and/or floating marine structure, or fenders that are suspended along the fixed and/or floating marine structures with for example cables.

However, the main task of a fender is to protect two marine structures from severe damage due to impact when contacting each other by placing such a fender in between the two marine structures. To such a fender is usually referred to as a marine fender.

Known marine fenders are made of rubber, either solid or with an air chamber in the center. The size of the marine fender depends on the size and weight of the vessel and the consistency of for example a quay, wharf etc. Heavy ships or vessels will be difficult to stop once in movement due to a great momentum force. Therefore the fender needs to be able to absorb the momentum forces and slow down the ship without severely damaging the hull or the hull getting in direct contact to the quay or wharf etc. Due to high forces, especially friction, between the fender and wall of the wharf or dock or the hull of the ship the rubber material of the fender may roll up and will wear rapidly, such that costly replacements and/or repairs are necessary at regular intervals.

Some known fenders are fixed to the hull of the vessel at certain locations. This is especially important for for example pilot boats that may be in direct contact with other ships, such that time consuming placement of loose suspending fenders are not an option. The mooring between the pilot boats and ship is usually performed whilst both are moving, such that friction between the fender of the pilot boat and the hull of the ship may be high, resulting in fast wear, ripping, tearing or rolling up of the rubber existing fender. Maintenance intervals may have to be regularly scheduled, increasing maintenance cost and the fact the pilot boats can not be used during the time consuming repairs.

Moreover, known marine fenders, especially the type mounted to hulls of vessels, are fixed by means of plates, clamping and holding the rubber marine fender in place. The plates are mounted to the hull with heavy bolts. Heavy bolts are needed due to the high forces acting on the fender during use. The bolts are mounted in holes that are drilled through or in the structure like the hull of the ship, enhancing possible leakage in for example rough sea with high waves and/or bad weather. Replacement of such fenders is time consuming and may result therefore in high maintenance cost, as mostly the fender needs to be disassembled for repair or replacement and this often has to be done in a dock or special other repair environment.

Existing rubber marine fenders are heavy, negatively effecting fuel efficiency and lowering maximum speed possible for, in particular, such fast ships like pilot boats or other fast marine vessels. The weight comes especially from the solid rubber and the mounting with heavy materials, like the above mentioned bolts and plates.

Especially when using known marine fenders in for example a lock of a harbor, replacing or repairing damaged fenders can be costly. Not only maintenance costs are relatively high, but also valuable time during repair in which the lock can not be used.

Publication US 2002/0152943 discloses an integrated boat hull bumper comprising a framing with chambers. A first foam layer is poured in the chambers and when the first foam layer is cured, a second foam layer is applied. Between the first and the second foam layer a fiber glass layer may be formed.

Publication U.S. Pat. No. 5,878,685 discloses a foam collar system that is affixed to the external surface of the boat hull. The collar comprises three layers of foam material that are being preformed by molding using heat and pressure. Optionally, a reinforcement mesh can be placed on attachment flanges.

An object of the invention therefore is to provide a fender that obviates at least one of the above mentioned drawbacks.

Thereto, the invention provides for a fender for protecting an object against impact comprising a core of at least a closed cell foam part, an intermediate layer fully enclosing the core comprising at least a fiber reinforced cloth, a coating that at least partly covers the intermediate layer.

By providing a fender with a core of closed cell foam, covered with an intermediate layer of fiber reinforced cloth and a coating, the fender can be relatively light weight, relatively strong and relatively elastic, compared to the known rubber fenders. Also, an internal reinforcement structure and/or frame may be obviated.

The core is provided of at least a closed cell foam part. The closed cell foam is preferably a cross linked closed cell foam, preferably cross linked closed cell polyethylene, also denoted as PEX. Many variants of PEX are available. Typically, other materials with a closed cell structure may also be used.

By varying the density of the closed cell foam part, the elasticity of the fender can be varied depending on the desired elasticity. The desired elasticity depends on the application of the fender, the type of object, such as a petrol vessel or a quay wall, the type of maneuvers, the frequency of maneuvers and/or impacts, etc.

By providing a closed cell foam, the foam cells will not absorb water. In particular when the foam is damaged, only the cells in the damaged region may be ruptured, other cells remain closed and do not absorb water. This is advantageous for the weight distribution of the fender, also of a damaged fender. In addition, by providing a closed cell foam, the damaged region can be easily removed, for example by sawing out the damaged part, and replaced with a new closed cell foam block that can be glued to the remainder of the core.

By providing a cross linked foam, the durability and/or life time of the fender may increase.

Closed cell foam, such as closed cell polyethylene, or any other closed cell material is usually available in various densities, typically referred to as 'low density', 'medium density', 'high density', and/or more. Depending on the elasticity required, a different density can be chosen.

The closed cell foam is typically provided from solid premanufactured blocks of more or less regular dimensions. From such solid premanufactured blocks, a predetermined form can be cut or sawn out or milled to provide for a desired core form. Thus, every desired form of the fender can thus be obtained, which gives the designer a large design freedom, but also allows obtaining a form suitable for optimal protection of the object. Preferably, the at least one closed cell foam part of the core is manufactured from such a solid premanufactured foam block. The desired form of the foam part is cut, or otherwise extracted by abrasive means, such as sawn or milled, from the solid foam block. This is contrary to the prior art, where the foam may be poured in a liquid state into chambers to be cured or where foam may be hot moulded to bring it into the desired form. According to the invention, a solid closed cell foam block is provided to manufacture the closed cell foam part therefrom.

In the context of this disclosure, the wording 'solid' is used to refer to the physical state of the block material, i.e. the block material is solid as opposed to liquid. Further, the foam blocks are premanufactured, i.e. in the process of manufacturing a fender according to the invention, the blocks are a semimanufactured product from which the fender, or at least a foam part thereof, is made.

The core may also comprise at least two closed cell foam parts, wherein at least two of the parts have a mutually different density. By providing different foam parts having different densities, the elasticity of the core, and thus of the fender, can be modelled depending on the desired elasticity. Also, by providing closed cell foam parts of various densities, the spring characteristics can be modelled depending on the desired spring characteristics, e.g. whether a linear spring characteristic or a progressive spring characteristic is desired.

Further, by providing multiple closed cell foam parts not only the elasticity and/or spring characteristics can be varied from one fender to another, but also, the elasticity and/or spring characteristics can be varied over the fender. For example, at one location of the fender, where e.g. large and/or heavy impacts are expected, foam parts of a higher density may be applied, or multiple foam blocks resulting in a rather progressive spring characteristic may be applied, while at another location of the fender, where e.g. less loads and/or impacts are expected, it may be sufficient to provide a single foam part of a relatively low or medium density. Thus, depending on the desired characteristics of the fender, the core can be designed by using various foam parts of different densities. So, the fender can be designed custom made, as well as in characteristics, such as elasticity, spring characteristics etc. as in form, shape or external dimensions. By varying the foam parts depending on the required design characteristics, weight can be saved, while obtaining a sufficient elastic fender which is relatively light. Due to a relatively light weight fender, the fuel consumption of a floating structure can be reduced while the top speed can be increased.

Further, by providing multiple closed cell foam parts, an additional layer, such as a ballistic layer may be provided between two closed cell foam parts to provide for additional characteristics. A ballistic layer, comprising a PVC-cloth outer layer or similar material and a ballistic material cloth inner layer, comprising Kevlar®, Twaron®, Aramide® or similar material, may provide for bullet-proof protection. The ballistic layer can be adapted depending on the required ballistic protection.

The intermediate layer is preferably a fiber reinforced cloth that fully covers the core. The cloth provides for the strength of the fender and may protect the core from damage. Due to the fiber reinforcements, the cloth is relatively strong and may provide some resistance against tearing, thereby enhancing the strength and/or the durability of the fender. Any reinforcement construction, such as a frame or flanges or ribs or chambers, may thus be obviated, thereby reducing the weight of the fender.

The cloth is glued to the core to obtain a firm connection. Typically, a two-component contact adhesive is used.

The intermediate layer fully encloses the core, such that strength is provided to the core over the whole core, also while the cloth is glued to the core over the whole core. The cloth fully covers the core, such that the complete external surface, for longitudinal marine fenders, in longitudinal direction as well in circumferential direction is covered by the cloth. For, e.g. a longitudinal fender, preferably also the top and bottom ends are covered by the cloth. For other shapes of the core, the complete external surface is covered by the cloth. The cloth is glued in such a way that it forms a complete airtight layer around the foam core. Therefore the airtight skin reacts as a pneumatic fender and supports the foam core during compression. Also, the airtight layer prevents that air escapes from damaged cells in the foam core and thus ensures a better durability of the fender.

The cloth is reinforced with fibers. The cloth may for example be a PVC-cloth or a neoprene cloth, reinforced with known fibers, such as canvas, glass, etc. Advantageously, the cloth is of Hypalon® material or a similar material.

Advantageously, the cloth is a woven fabric to provide for more strength and resistance against tearing than a non-woven cloth.

In an advantageous embodiment, the intermediate layer comprises at least two at least partly overlapping fiber reinforced cloths. Preferably, the cloths are overlapping at positions of the fender where additional strength may be required, e.g. at or near corners. By providing multiple layers of cloth, the strength of the fender can be, whether or not locally, adapted depending on the required strength. By varying the intermediate layer depending on the required strength, weight can be saved while satisfying desired strength requirements, thereby a relatively light fender can be obtained.

The intermediate layer is further covered with a coating. At least the part of the intermediate layer that is vulnerable for external influences is covered with a coating, for example the fender can be covered with a coating except for the part of the fender attached to the object. Advantageously, the complete fender is covered by a coating.

Repairing the intermediate layer can be easily done by replacing the damaged cloth by a new piece of cloth. The damaged cloth can be removed from the core or from other cloth layers, e.g. by sawing or cutting. The new piece of cloth can be easily attached to the existing fender structure, e.g. by gluing.

The coating provides for strength, protection and resistance of the fender, for example against wear, UV, etc. Also, the coating provides for a water-tight closure of the fender. Applying the coating to the intermediate layer provides for additional strength of the intermediate layer of which at least the resistance against tearing increases. Therefore, the strength of the fender also increases. Furthermore, the coating significantly adds to the wear resistance of the fender, thereby increasing the life time and/or durability of the fender.

Preferably, the coating is sprayed onto the intermediate layer. The coating may be applied to the intermediate layer in various layers, depending on the required local protection, such that the thickness of the coating may vary locally over the fender, as well as may vary from fender to fender, depending on the design requirements. Typically, the minimum layer thickness of the coating is approximately 3 mm, each further layer can be approximately 1 mm. A layer thickness of approximately 15 mm or 20 mm may be reached where the strength and/or wear resistance may be required. Contrary to the prior art, where the coating is moulded over the fender, the layer thickness can be controlled relatively well. Also, the layer thickness can be less than the known prior art coating thicknesses. Due to the relatively small layer thickness of the coating, additional weight can be saved and the fender can become relatively light.

The coating may also be provided with anti-slip characteristics, which can relatively easily be obtained by spraying the coating in a more rough pattern on the fender, e.g. by spraying from a larger distance. Due to the anti-slip, part of the fender may be used as boat landing. Also, due to the anti-slip the friction between the fender and an impacting structure may be relatively high, which may decrease the "rolling up" of the fender, and may also result in more calm behaviour of the floating structure to which the fender is attached and/or that contacts the fender. The coating is available in various finishings, such as anti-slip or colours.

Preferably, the coating comprises PolyUrea™ or a similar material to provide for optimal protection.

Damaged coating can be easily repaired by spraying a new layer of coating over the damaged part or by first removing the damaged part, e.g. by sawing or cutting, and then spraying a new coating. Due to a two-component material, the coating can even be repaired on site, and there does not need to be waited until the next maintenance/repair interval.

The marine fender can be attached to the floating or fixed naval object by known attachment means, preferably using adhesives, such as a two-component glue such as Sikaflex® or similar materials. When the marine fender is attached to e.g. the vessel hull, it becomes an inextricable part of the vessel and as such, the buoyancy of the fender can be integrated to the stability calculations of the vessel. Furthermore, even when the fender is damaged, the buoyancy of the fender remains, because, due to the closed cell structure, there is no or minimal water entrance into the fender. Thus, the marine fender can, already during the design phase, be considered as an integral part of the naval structure, in particular of a floating naval structure.

Due to the relative easy manufacturing of the marine fender and/or relatively light weight of the fender, the fender can become integrated to the design process of the vessel. This provides for a more optimal and/or more efficient design of the marine fender and/or fixed or floating naval structure.

In an advantageous embodiment of the fender, at least a closed cell foam part is provided with at least one hole for receiving an elastic element. The hole in the foam part can be a trough hole accessible from both sides, or can be a blind hole accessible from one side. The elastic element can be a spring element, such as a pressure spring or a disc spring, or a composition of a spring and damper element, many variants are possible.

To enclose the spring element in the hole, the opening of the hole is closed off by a closing layer, preferably a rubber layer. The closing layer is sufficiently strong to minimize internal wear of the core and to provide for sufficient support for the elastic elements. Advantageously, cups may be provided in which the elastic element can be supported.

By providing a core with elastic elements, the spring characteristics of the fender can be enhanced further. This may be particularly advantageous when heavy impact loads are expected. In that case, by using the elastic elements, relatively large elasticity may be provided while keeping the fender relatively limited in weight and size.

The invention further relates to a fixed or floating marine structure provided with such a marine fender. A fixed marine structure can e.g. be an offshore platform, or a quay, or a bridge column, or a mooring structure, etc. A floating marine structure can e.g. be a vessel, boat, barge, buoy, etc. Many variants are possible. Advantageously, the marine fender is attached to the fixed or floating marine structure such that it becomes an inextricable part of the structure.

Also, the fender can be used as a stand-alone ballistic protection shield, for example for people on patrol boats or otherwise. In this embodiment, the fender is not necessarily a marine fender, but is mere a ballistic fender. Prior art ballistic shields typically are heavy, stand-alone shields that can be carried by a single person. However, due to the large weight, these shields may be difficult to handle and/or to carry. By providing a ballistic fender, i.e. a fender according to the invention with a ballistic layer in between two closed cell foam parts, a relatively light weight ballistic shield can be provided. Since, the foam parts can be provided in any shape, they also can be provided in the shape of a shield. A ballistic layer, comprising a PVC-cloth outer layer or similar material and a ballistic material cloth inner layer, comprising Kevlar®, Twaron®, Aramide® or similar material, may provide for bullet-proof protection. The ballistic layer can be adapted depending on the required ballistic protection. Such a ballistic fender can be provided as a stand-alone ballistic shield. Also, a marine fender can be provided with a ballistic layer to add ballistic characteristics to the fender and/or naval structure and/or vessel hull.

The invention further relates to a method for manufacturing a fender.

Further advantageous embodiments are in the subclaims.

The invention will further be elucidated on the basis of exemplary embodiments which are represented in the drawings. The exemplary embodiments are given by way of non-limitative illustration of the invention.

In the drawings.

It is noted that the figures are only schematic representations of embodiments of the invention that are given by way on non-limiting example. In the figures, the same or corresponding parts are designated with the same reference numerals.

Figure 1:
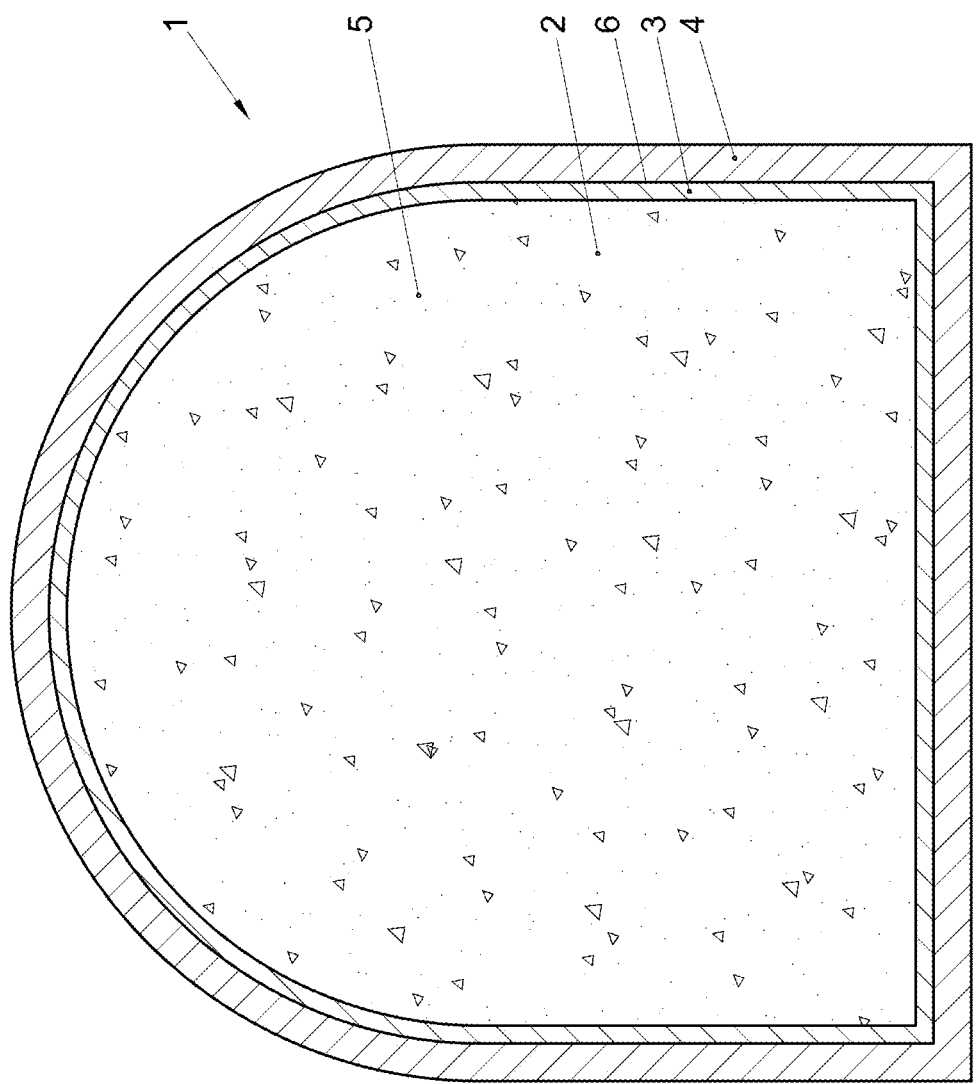
FIG. 1 shows a schematic cross section of a first embodiment of a fender according to the invention.

FIG. 1 shows a first embodiment of a fender 1, here a marine fender 1, according to the invention. The marine fender 1 comprises a core 2, an intermediate layer 3 and a coating 4. The marine fender 1 is attached to structures, e.g. vessels or boats or barges or platforms or quays or bridge pillars etc. to protect that object from damage due to contact with another object. Typically, the fender 1 can be attached to a patrol boat or a tender boat that frequently moors to other vessels or structures and during mooring contacts the other vessel or structure.

The fender 1 can be attached to the object by known attachment means such as screws, bolts, adhesives etc. although advantageously adhesives are used such that the fender can become an inextricable part of the object, e.g. a vessel hull. By providing the fender as an inextricable part of e.g. the vessel hull, the marine fender can be taken into account upon the vessel design and/or the buoyancy of the marine fender can be taken into account for stability calculations of the vessel.

In this example the core 2 comprises a single closed cell foam part 5. The foam part 5 is made of a closed cell foam, preferably a cross-linked closed cell foam, such as a cross-linked polyethylene. The closed cell foam part 5 usually has a specified density, depending on the required elasticity. By providing a closed cell foam, the core 2 is basically water tight, except for damaged regions, such as a cut that also protrudes the core 2.

The closed cell foam part 5 can be cut in any shape, depending on the design requirements, from premanufactured solid foam blocks. By varying the shape of the core 3, the fender 1 can be provided in any desired form, allowing a large design and/or application flexibility. Not only any desired cross sectional shape can be provided, also in longitudinal direction, the fender 1 can be provided in various forms, depending on the design requirements. This gives a large flexibility to the designer who can design the fender 1 to fit precisely for example a hull of a boat.

The core 2 provides for the elasticity of the fender 1. By choosing a closed cell foam for the core 2, the fender 1 can be relatively light weight while still sufficient elasticity can be provided, thereby reducing the fuel consumption of a floating marine structure equipped with the fender 1.

The intermediate layer 3 comprises in this embodiment a single fiber reinforced cloth 6. The intermediate layer 3 fully encloses the core 2 circumferentially, as can be seen in the cross-section shown in FIG. 1. The cloth 6 fully extends in the longitudinal direction of the fender 1, i.e. in a direction perpendicular to the cross-section of FIG. 1, preferably it also encloses the ends of the fender 1 (not shown). The cloth 6 is joined to the core 2, preferably by an adhesive. The fiber reinforced cloth 6 can be a woven fabric, such as Hypalon® or a similar fiber reinforced material. The intermediate layer 3 provides for the strength of the fender 1. By using a fiber reinforced cloth, in particular a woven fabric, additional resistance against for example tearing can be obtained. Advantageously, the cloth 6 is joined to the core 2 to form a complete air tight layer around the core 2 to prevent air from escaping from the core 2, which is in particular advantageous in case of damage to ensure better durability of the fender.

The coating 4 in this example fully covers the intermediate layer 3, but can also cover only a part of the intermediate layer 3, for example that part that is subject to environmental influences or to external contact forces, such as the part of the fender 1 that is not connected to the object, e.g. the hull of a vessel or a side of a quay. The coating 4 significantly adds to the strength and/or resistance, in particular against wear, of the fender 1.

Preferably, the coating 4 is sprayed over the intermediate layer 3. The thickness of the coating 4 can be varied depending on the desired protection. The coating 4 protects the fender 1 in particular against friction, thereby increasing the life time of the fender 1. The coating 4 also enhances the water tightness of the fender 1. Advantageously, the coating 4 is two-component coating comprising PolyUrea™ which has a relatively short drying time, allowing the coating to be repaired on site.

Figure 2:
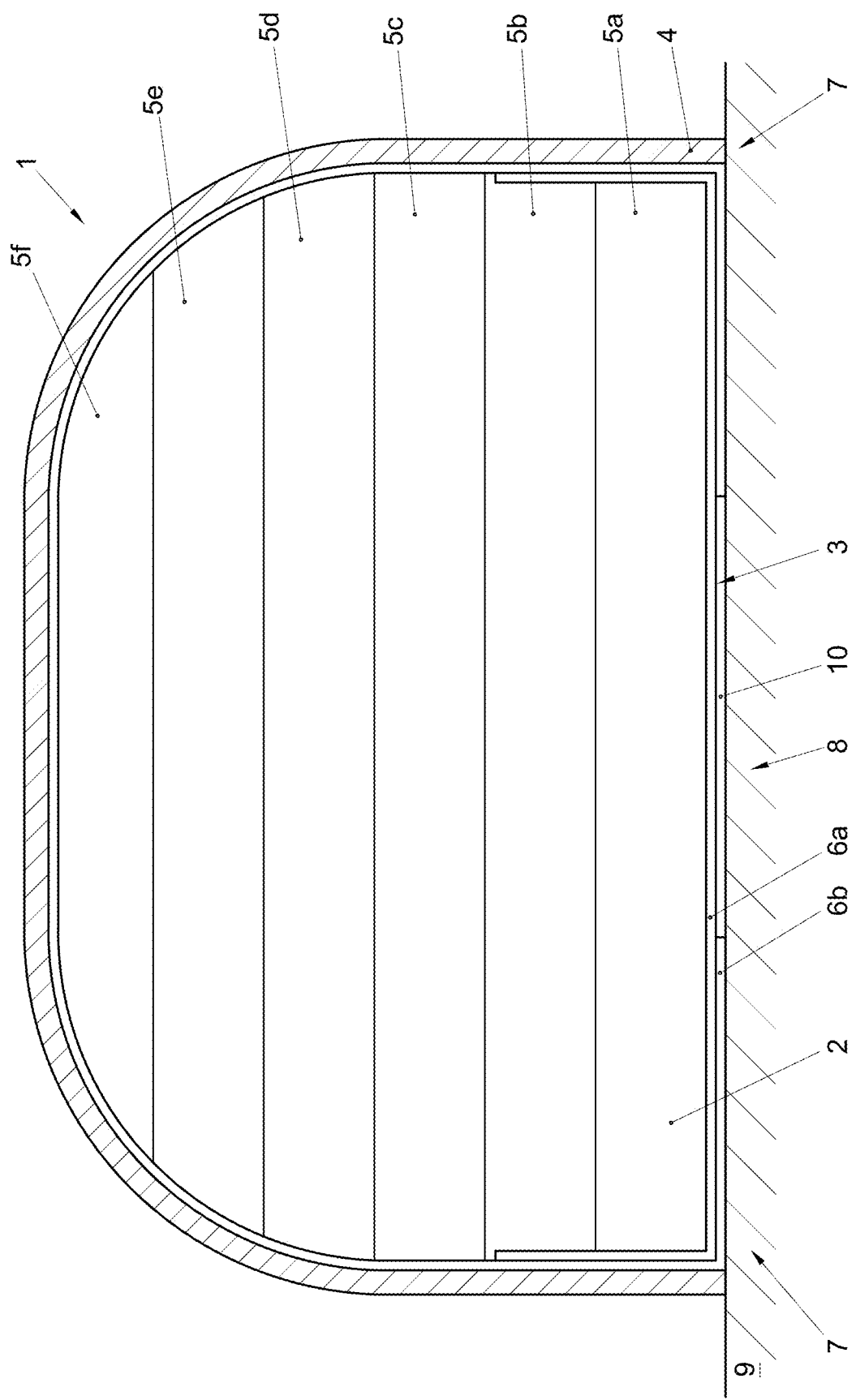
FIG. 2 shows a schematic cross section of a second embodiment of a fender according to the invention.

In the second embodiment of FIG. 2, it can be seen that the core 2 comprises multiple closed cell foam parts 5a, 5b, 5c, 5d, 5e, 5f. Each closed cell foam part 5a, 5b, 5c, 5d, 5e, 5f can have a mutually different density, but can also have the same density. For example, it may happen that the core 2 is that large that it can not be manufactured from a single standard available solid foam block of closed cell foam. Multiple solid premanufactured blocks of closed cell foam having the same density can then be glued together to form a single closed cell foam part of a particular density.

By providing multiple closed cell foam parts 5a, 5b, 5c, 5d, 5e, 5f of which at least two of them have mutually different densities, the elasticity of the fender 1 can be varied. By combining multiple closed cell foam parts 5a, 5b, 5c, 5d, 5e, 5f with different densities also a core 2 with a progressive spring characteristic can be obtained. Thus, a core 2 having the spring characteristics that fit the required spring characteristics can be provided. This gives the designer a large flexibility in designing the fender 1 and/or the object to which it has to be attached since a relatively light weight fender 1 that fulfils the required spring characteristics can be obtained. This is contrary to the prior art fender, that basically has no progressive spring characteristics.

Also shown in FIG. 2 is an intermediate layer 3 that comprises two at least partially overlapping fiber reinforced cloths 6a, 6b. The fiber reinforced cloths 6a, 6b overlap at the corners 7 of the fender 1. The corners 7 are during use more heavy loaded than other parts of the fender 1. To additionally strengthen the corners 7, the intermediate layer 3 is thicker at the corners 7 than at the remainder of the fender 1. The additional thickness is in this embodiment obtained by providing two fiber reinforced cloths 6a, 6b that overlap at the corners 7. By partly overlapping the fiber reinforced cloths 6a, 6b the core 2 can be fully enclosed in a relatively easy way by working with multiple cloths.

Alternatively, a single fiber reinforced cloth can be used having a variable thickness such that the thicker part of the cloth covers the corners.

In this embodiment, it can be seen that the coating 4 covers part of the fender 1. A rear side 8 of the fender 1 is not covered by the coating 4.

The fender 1 is attached to the object 9 to be protected with its rear side 8. Known attachment means can be used, but it is advantageous to use a two-component adhesive such as Sikaflex®, or any other suitable adhesive. By providing additional thickness at the corners 7 of the intermediate layer 3, there is an air space 10 between the intermediate layer 3 and the object 9. This air space 10 can be advantageous for the adhesive quality of the connection when using Sikaflex® or a similar adhesive, since such an adhesive usually requires humidity for hardening.

The coating 4 can have a thickness between approximately 3-15 or approximately 20 mm, which is smaller than the coating on a prior art fender. By providing a coating with a smaller layer thickness, the fender can become more light weight, thus saving fuel and/or increasing the top speed of floating structures.

The coating 4 can easily be provided with an anti-slip structure, by simply spraying it more roughly onto the intermediate layer 3 such that the coating dries more in grains. Additionally, due to the roughness of the coating, the friction between the object to be protected and the structure with which it is in contact, e.g. tender boat to vessel contact during mooring, is higher and the movement of the tender boat can become more calm, which is advantageous for the people working on board of the tender boat, and also reduces additional damages due to wild movements of the tender boat.

Figure 3:
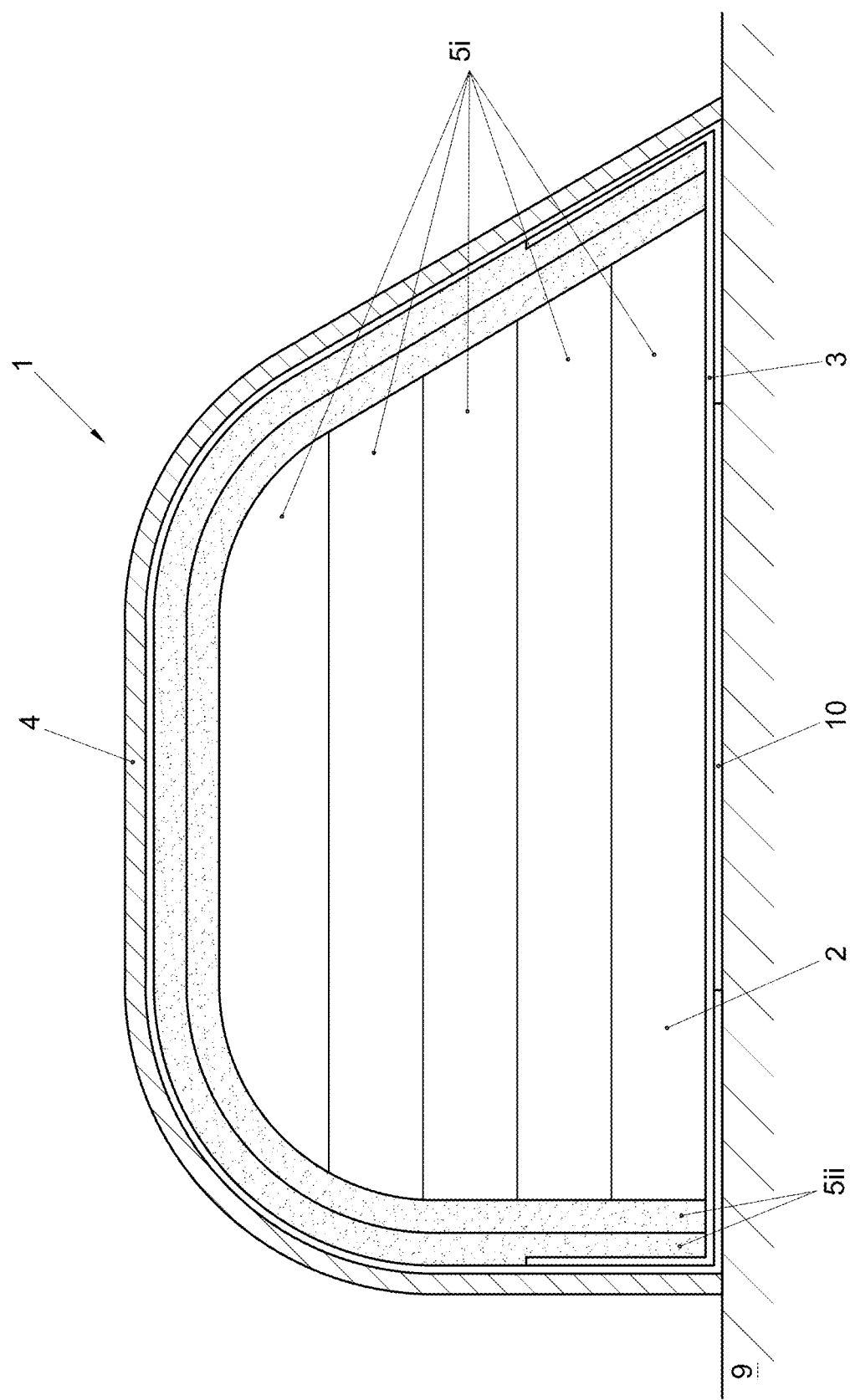
FIG. 3 shows a schematic cross section of a third embodiment of a fender according to the invention.
Figure 4:
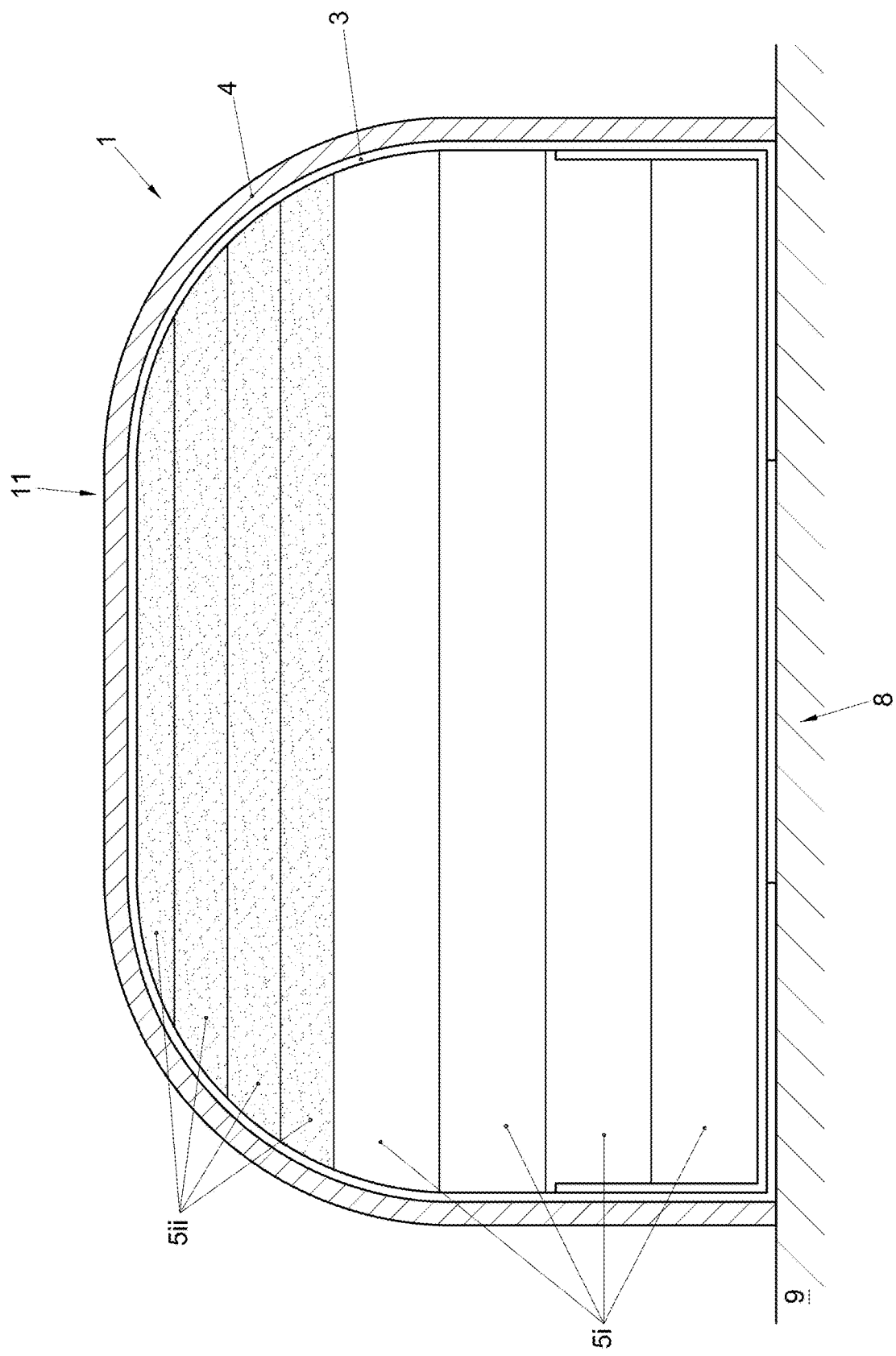
FIG. 4 shows a schematic cross section of a fourth embodiment of a fender according to the invention.

In FIG. 3 a third embodiment of the fender 1 is shown. This embodiment shows that the core 2 can be manufactured in various shapes. The core 2 here comprises closed cell foam parts 5*i* having a first density and closed cell foam parts 5*ii* having a second density. The second density can be higher than the first density, for example the second density can be 100 kg/m³, the first density can be 35 kg/m³. Other densities are available and possible. The closed cell foam parts 5*i* can be connected to each other by using an adhesive, such as glue, which is suitable for that purpose. Similarly, the closed cell foam parts 5*ii* can be glued together, as well as the closed cell foam parts 5*ii* can be glued to the closed cell foam parts 5*i*. By using closed cell foam parts 5*i*, 5*ii* of different densities, various spring characteristics can be designed and obtained, as shown in the embodiment of FIG. 4.

Figure 5:
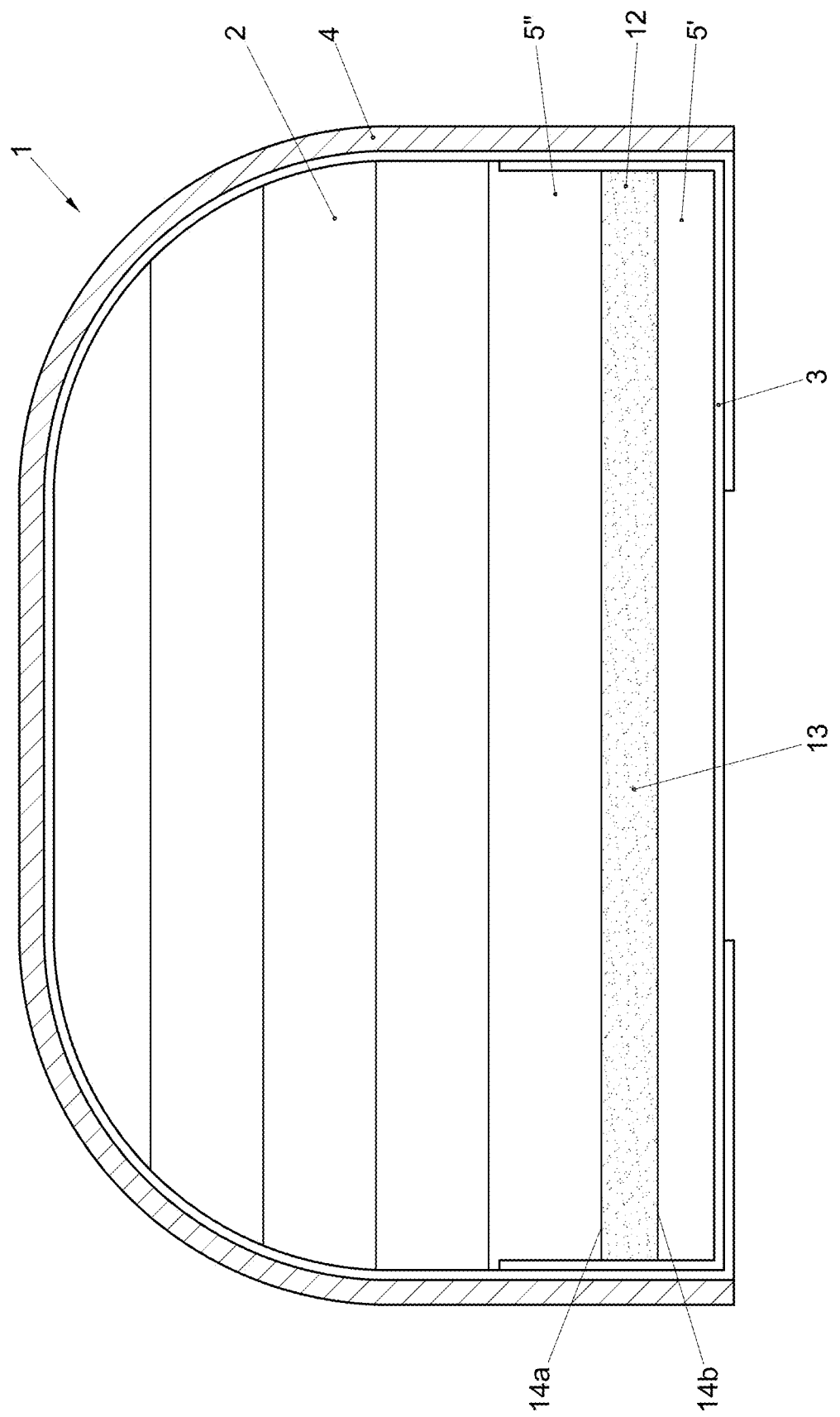
FIG. 5 shows a schematic cross section of a fifth embodiment of a fender according to the invention, with a ballistic layer.

The closed cell foam parts 5*ii* are here located at an outer edge of the fender 1. Alternatively, as can be seen in the embodiment of FIG. 5, the closed cell foam parts 5*ii* of a second density are located at a front side 11 of the fender 1. Depending on the location of the different closed cell foam parts 5*i*, 5*ii* with respect to each other, the elasticity and spring characteristics can vary.

FIG. 5 shows another embodiment of the fender 1 comprising a ballistic layer 12. The ballistic layer 12 is enclosed between two closed cell foam parts 5' and 5". The ballistic layer 12 is built up of various layers of a ballistic fabric material 13, such as Kevlar® or a similar material. Typically, there can be 20-45 layers of ballistic fabric material. The ballistic fabric material 13 can be enclosed between an end layer 14*a* and an end layer 14*b* of another material such as PVC to provide for adhesion to the closed cell foam parts 5', 5". Many variants of ballistic layers 12 can be provided such that the fender 1 can be made ballistic proof as required by various ballistic regulatory classifications. Such a ballistic fender may be used as a stand alone ballistic shield to protect people and/or objects from damage or injury, e.g. from ballistic objects. Also, a marine fender 1 may be provided with the ballistic layer 12 to form a marine fender with ballistic properties.

Figure 6:
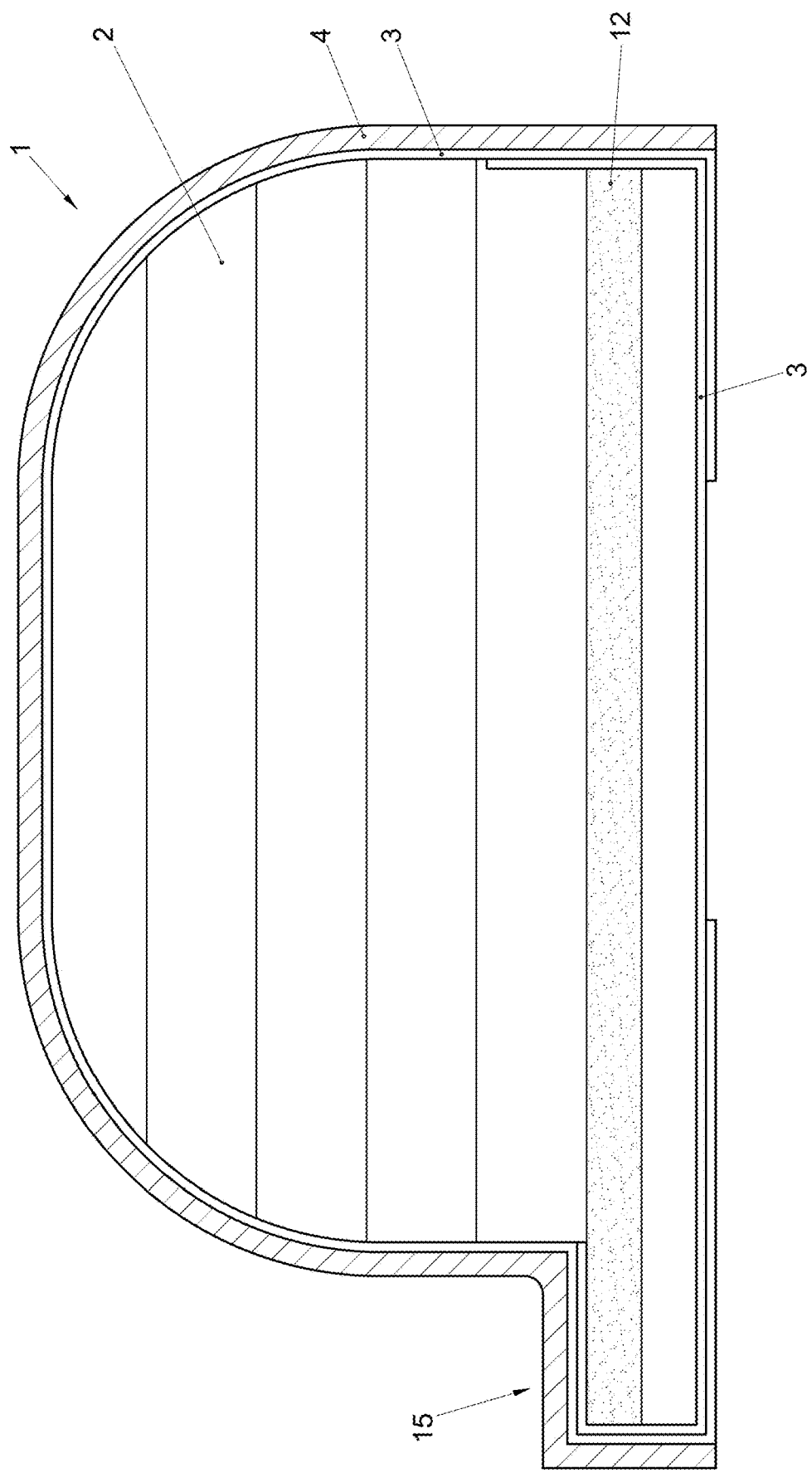
FIG. 6 shows a schematic cross section of a sixth embodiment of a fender according to the invention, with a ballistic layer.

FIG. 6 shows a fender 1 with yet another shape and having a ballistic layer 12 extending in a flange 15 of the fender 1.

Figure 7:
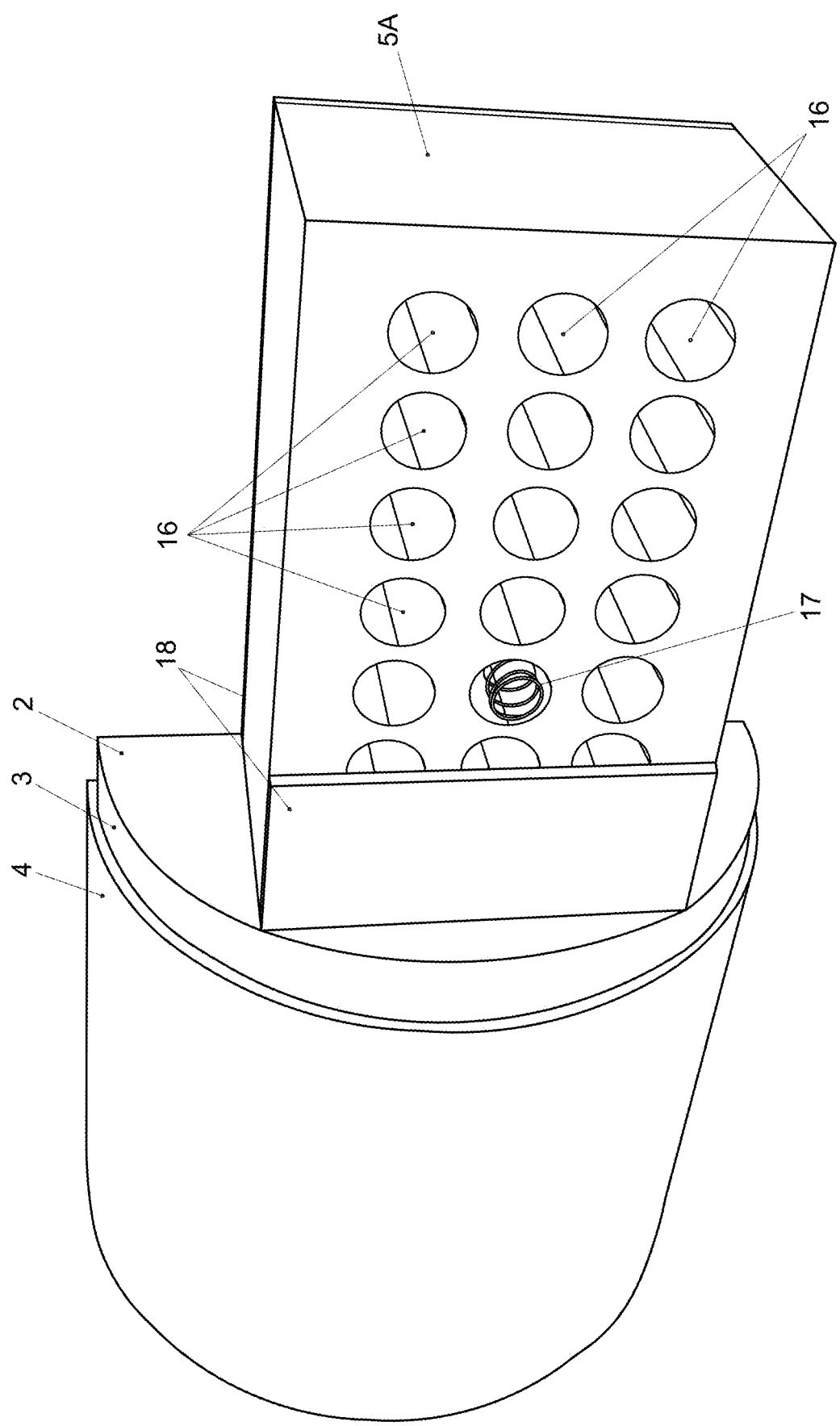
FIG. 7 shows a schematic cross section of a seventh embodiment of a fender according to the invention; with elastic elements.

FIG. 7 shows a further embodiment of a fender 1 having a so-called "active" core 2. In this embodiment, a closed cell foam part 5A is provided with holes or pockets 16 in which an elastic element 17 can be received. The elastic element 17 is in this embodiment a spring element, in particular a spiral spring element. Other elastic elements may be possible. To enclose the elastic elements 17 in the pockets 16, the closed cell foam part 5A is at both sides covered with a closing layer 18. The closing layer 18 not only encloses the spring 17 in the pocket 16, but also provides for support against which the spring 17 can act. The closing layer 18 preferably is a rubber layer. Using rubber for the closing layer allows at one hand sufficient strength to provide support and at another hand allows sufficient elasticity to provide for the elasticity of the core 2. The closed cell foam part 5A provided with the elastic elements 17 is also referred to as the "active" closed cell foam part 5A. The active closed cell foam part allows obtaining a spring characteristic suitable for relatively heavy forces while the fender 1 can remain relatively light due to the use of closed cell foam.

A fender 1 according to the invention can be provided in various forms and shapes, both two-dimensional as three-dimensional due to the use of closed cell foam parts. Also, by using foam parts of different densities or by using an active foam part, various spring characteristics can be provided, while maintaining the fender 1 relatively low weight.

The fender 1 can also be easily repaired, contrary to prior art rubber fenders. A damaged region of a foam part can be cut out and can be replaced by a new foam part that can be glued into the thus created hole. Damaged cloth can be cut out and can be replaced by new cloth, or simply new cloth can be placed over the damaged cloth and connected by means of adhesives. Damaged coating can easily be sprayed over with a new layer of coating. This makes the fender relative easy to repair, also on site, on water, off shore, such that expensive interval trips to the shore for maintenance can be avoided. During the regular scheduled maintenance the fender can be repaired in controlled circumstances. This reduces the operating costs of a floating structure, such as a boat or a vessel, and increasing the operating time. The fender according to the invention typically is a marine fender for attachment to a fixed or floating naval structure, or can be a stand alone marine fender that is connected e.g. via ropes or wires to a fixed or floating naval structure. The fender may have ballistic properties when provided with a ballistic layer and as such may serve as a stand-alone ballistic shield.

Many variants will be apparent to the person skilled in the art. All variants are understood to be comprised within the scope of the invention as defined in the following claims.

The invention claimed is:

1. A momentum absorbent, elastic fender that compresses upon impact with an object to protect a fixed or floating maritime structure from damage, the fender comprising:
    a compressible core of at least one closed cell foam part formed from a solid pre-manufactured block of an elastic, high density, closed cell foam, wherein the core provides elasticity to the fender to absorb momentum forces produced by the object impacting the fixed or floating maritime structure,
    an intermediate layer fully enclosing the core, the intermediate layer comprising at least one fiber reinforced cloth, and
    a coating that at least partly covers the intermediate layer.

2. The fender according to claim 1, wherein the core comprises at least two closed cell foam parts, wherein at least two of the at least two closed cell foam parts have a mutually different density.

3. The fender according to claim 1, wherein the intermediate layer comprises at least two fiber reinforced cloths that at least partly overlapping fiber reinforced cloths.

4. The fender according to claim 1, wherein the coating covers the intermediate layer completely.

5. The fender according to claim 1, wherein the coating is a sprayed coating.

6. The fender according to claim 1, wherein at least one of the at least one closed cell foam part is provided with at least one hole for receiving at least one elastic element.

7. The fender according to claim 6, wherein the at least one hole in the at least one closed cell foam part is a through hole.

8. The fender according to claim 6, wherein an opening of at least one of the at least one hole is closed off by a closing layer for enclosing the elastic element in the hole.

9. The fender according to claim 8, wherein the closing layer is a rubber layer.

10. The fender according to claim 1, wherein the core further comprises a ballistic layer.

11. A fixed or floating maritime structure provided with a fender according to claim 1.

12. The fender according to claim 1, wherein the intermediate layer is attached to the object.

13. The fender according to claim 1 further comprising an adhesive layer, wherein the adhesive layer is disposed between the intermediate layer and the object.

14. A method for manufacturing a momentum absorbent, elastic fender that compresses upon impact with an object to protect a fixed or floating maritime structure from damage, the method comprising:
    providing a solid pre-manufactured block of an elastic closed cell foam;
    cutting, sawing or milling a core out of the block of high density foam in a desired form, wherein the core provides elasticity to the fender to absorb momentum forces produced by the object impacting the fixed or floating maritime structure;
    fully covering the core with an intermediate layer comprising fiber reinforced cloth; and
    spraying a coating on the intermediate layer to at least partly cover the intermediate layer with the coating.

15. The method according to claim 14, wherein the coating is sprayed over the intermediate layer.

16. The method according to claim 14, further comprising providing a further closed cell foam part such that the core comprises at least two closed cell foam parts of a mutually different density.

17. The method according to claim 14, wherein at least one of the at least one closed cell foam part is provided with at least one hole for receiving an elastic element.

18. The method according to claim 14, further comprising providing a solid closed cell foam block to manufacture at least one of the at least one closed cell foam part therefrom.

19. A momentum absorbent, elastic fender that compresses upon impact with an object to protect a fixed or floating maritime structure from damage, the fender comprising:
    a compressible core of at least one closed cell foam part formed cut, sawn or milled from a solid, pre-manufactured block of an elastic, high density closed cell foam, wherein the core provides elasticity to the fender to absorb momentum forces produced by the object impacting the fixed or floating maritime structure,
    an intermediate layer fully enclosing the core, the intermediate layer comprising at least one fiber reinforced cloth, and
    a coating sprayed on the intermediate layer, wherein the coating at least partly covers the intermediate layer.

* * * * *